United States Patent [19]

[11] 3,851,128
[45] Nov. 26, 1974

[54] LIFT FORCE FAN FAILURE DETECTOR
[73] Assignee: GTE Automatic Electric Laboratories Incorporated, Northlake, Ill.
[22] Filed: Jan. 2, 1974
[21] Appl. No.: 430,008

[52] U.S. Cl. ...... 200/81.9 R, 200/153 T, 340/239 R
[51] Int. Cl. ............................................ H01h 35/40
[58] Field of Search........ 340/229, 239 R, 240, 241; 73/194 E, 205 R, 516 R; 200/81 R, 81.9 R, 153 T, DIG. 31, 308, 329, 336, 338

[56] References Cited
UNITED STATES PATENTS
| | | | |
|---|---|---|---|
| 2,373,089 | 4/1945 | Allen | 200/81.9 R |
| 2,947,834 | 8/1960 | Scope | 200/81.9 R |
| 3,119,979 | 1/1964 | Martin | 340/239 R |

Primary Examiner—Robert K. Schaefer
Assistant Examiner—Gerald P. Tolin
Attorney, Agent, or Firm—James V. Lapacek

[57] ABSTRACT

A fan failure detector apparatus is provided with a thin flat plate disposed within a fluid flow and oriented at a small angle relative to the fluid flow. The lift force produced moves the plate in a direction substantially perpendicular to the flow pattern so as to open an indicating circuit. An insufficient flow actuates the indicating circuit to indicate a fan failure.

5 Claims, 3 Drawing Figures 3,851,128

LIFT FORCE FAN FAILURE DETECTOR

BACKGROUND OF THE INVENTION

1. Field of the Invention

The present invention relates most generally to the field of fluid flow and more particularly to a fan failure detector apparatus utilized in racks of electrical apparatus and equipment frames.

2. Description of the Prior Art

In modern electronic systems, rack mounted electronics typically disipate large amounts of heat into the relatively confined volume of the systems outer package. To prolong the lifetime of electronic components and prevent thermal overloads, many systems incorporate various fans and blower arrangements. If the fluid flow producing assemblies within a system should fail to operate at a specified minimum output level, it is imperative that an alarm signal be actuated to alert local or remote maintenance and operating personnel to correct the failure before thermal operating limits are exceeded.

A preliminary novelty search revealed the following U.S. patents to which reference may be made generally to ascertain the prior art of the fluid detection field; U.S. Pat. Nos. 2,328,384; 2,947,834; 2,965,729; 3,303,305; and 1,936,356.

Fluid flow detectors of the prior art provide a vane element disposed within the fluid flow and a switch actuated at a predetermined fluid flow limit to indicate insufficient fluid flow conditions. Many modern electrical systems dictate the application of failure detectors which are of simpler construction and require less space than the devices of the prior art. Further it is advantageous to avoid the obstruction to air flow with resultant pressure drop inherent in the vane element devices.

OBJECTS AND SUMMARY OF THE INVENTION

Accordingly it is a principal object of the present invention to provide a fan failure detector apparatus which presents minimal obstructions to the fluid flow by the use of a flat plate disposed at a small angle to the direction of flow such that a resultant lift force is created forcing the plate in a direction substantially perpendicular to the flow pattern with the position of the plate element utilized to control a switch element indicating a failure of the fluid flow producing assembly within a system.

Another object is a fan failure detector apparatus of simple design which requires a minimum of space adjacent a fluid flow producing assembly of the system.

Another object is a fan failure detector apparatus that utilizes the lift force principal to reliably indicate insufficient air flow from a fluid flow producing assembly.

Other objects will appear from time to time in the ensuing specification, drawings and claims.

DESCRIPTION OF THE PREFERRED EMBODIMENT

Figure 1:
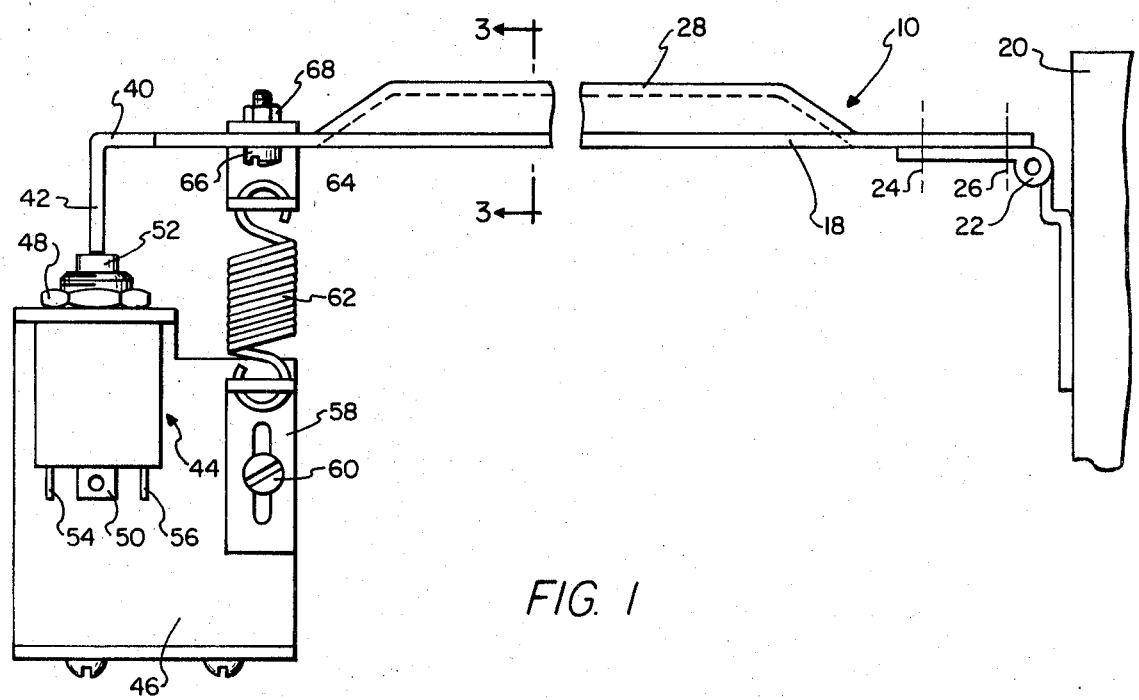
FIG. 1 is a top or plan view of a novel fan failure detector apparatus of the present invention.
Figure 2:
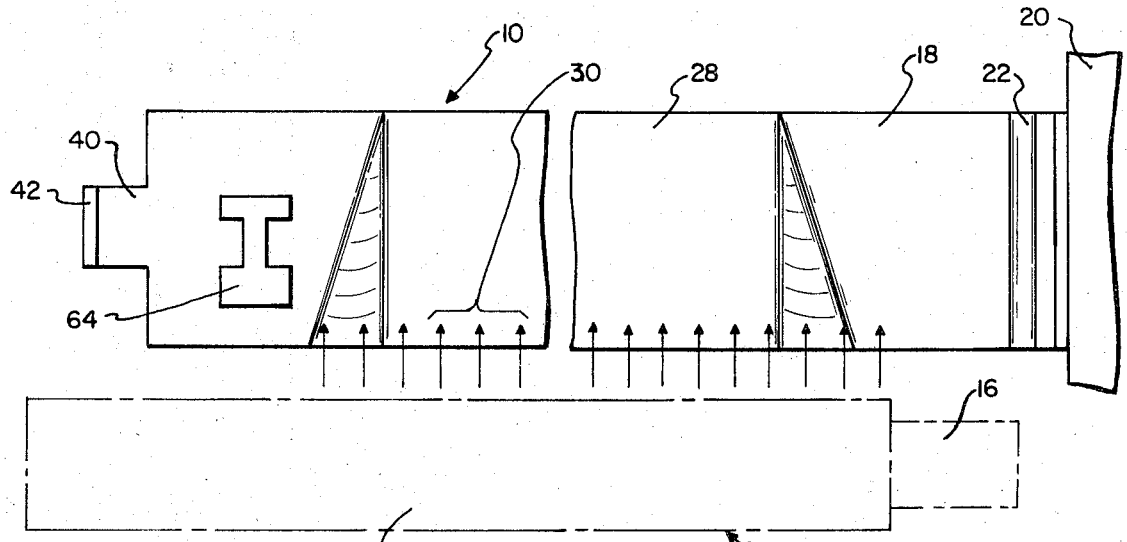
FIG. 2 is a front view of the fan failure detector apparatus illustrated in FIG. 1 with parts removed to show the detail of the lift plate.
Figure 3:
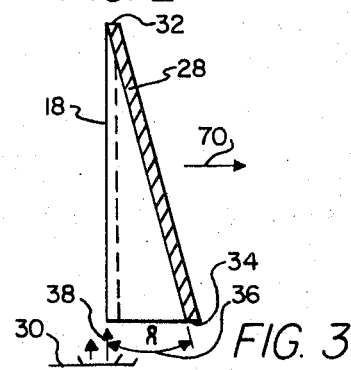
FIG. 3 is a sectional view taken along line 3—3 of FIG. 1.

The fan failure detector apparatus 10 as illustrated in FIGS. 1 through 3 is utilized in conjunction with electronics system frames and fan or blower assemblies as best shown in FIG. 1. It should be understood however that the failure detector apparatus may also be utilized in any fluid flow application where fluid flow producing assemblies are present. The failure detector apparatus 10 is oriented above the fan or blower assembly 12 of the system which includes a blower portion 14 and a motor portion 16. The fan assembly 12 in various arrangements might include a single axial fan, a single blower with a single outlet or a single blower with multiple outlets depending upon the geometry and fluid flow conditions required.

The fan failure detector apparatus 10 includes a thin flat plate portion 18 which is rotatably mounted to a support wall 20 of the system by means of a hinge assembly 22 which attaches to the plate 18 such as at points 24 and 26 by means of suitable fasteners. A substantial central portion 28 of plate 18 in the area of the main air flow as represented by arrows 30 is formed or stamped so as to curve out from the top edge 32 to the bottom edge 34. Thus a small angle 36 is formed between the angled surface of portion 28 and a vertical axis 38 along the remaining portion of plate 18 and hinge 22. The angle 36 is chosen to be between 8 and 10 degrees for most suitable operation as will be explained in detail hereinafter. The air flow as represented by arrows 30 from the blower assembly 12 is then directed substantially along the vertical axis 38. At the far end of plate 18, opposite the hinged end, the width of the plate is notched or cut away so as to form a projecting tab 40 with a switch engaging tab portion 42 formed at right angles to the plate 18 and tab 40 whose purpose will be explained in detail hereinafter. A switch assembly 44 is fastened to an angled bracket 46 by means of a nut 48 with the bracket 46 being mounted to the blower assembly 12 or other system support wall. Additional mounting support is furnished by tab 50 of the switch assembly 44 which is fastened to bracket 46. The switch 44 includes an actuator 52 which is in contact with the switch engaging tab 42 of plate 18 so that rotation of plate 18 about hinge 22 results in actuation of the switch 44. Output terminals 54 and 56 are provided on switch assembly 44 to indicate the closure of a contact set within switch 44 and controlled by actuator 52. Also mounted to angle bracket 46 is a second angle bracket 58 attached by screw 60 which carries one end of a coil spring 62 whose other end is connected to an angle bracket 64 mounted to plate 18 by means of bolt 66 and nut 68. Tension coil spring 62 is designed with sufficient force to rotate plate 18 about hinge 22 so as to actuate switch 44 when insufficient or no air flow is present at the output of blower 12.

When sufficient air flow as represented by arrows 30 from blower assembly 12 is present, the fluid flow will produce a force L known as lift force in the direction represented by arrow 70 in a direction substantially perpendicular to the air flow 30. The magnitude and relationship of force L is given by: $L = C_L \rho V^2 / 2 \ S$; where $C_L$ is the lift coefficient, which may be defined as $2\pi \sin \alpha$, where $\alpha$ is the angle represented by the arc 36; $\rho$ is the air density; $V$ is the air flow speed; and $S$ is the area of the flat plate 28. The various parameters including the spring constant of tension spring 62 are then calculated so that a predetermined sufficient value of air flow over the plate 28 from fan assembly 12 will produce a sufficient force $L$ to deflect spring 62 so as to deactuate the switch 44 indicating a position of sufficient air flow and satisfactory system operation. The lift force $L$ then overbalances the force of spring 62 so as to deflect the desired amount to release actuator 52 of the switch 44. When the blower assembly 12 or any output thereof fails to deliver sufficient capacity of air, the air speed $V$ will decrease and as a result the lift force $L$ will also decrease. Consequently the lift force $L$ will no longer be sufficient to overcome the spring tension and plate 18 is not rotated sufficiently about hinge 22 to deactuate the switch 44. With insufficient air flow, switch 44 is then actuated as indicated by the status of the contact set at output leads 54 and 56. An external alarm device, not shown, is connected to the output terminals 54 and 56 so as to actuate any desired alarm signal when switch 44 is actuated. It should be noted that any combination of parameters such as the fluid density, air flow speed, area of the plate 28, lift angle and spring geometry that results in the desired deflection of plate 18 between sufficient and insufficient air flow conditions can be utilized to indicate a failure by the actuation of a switch assembly oriented so as to be properly operated by the deflection of plate 18.

The failure detector apparatus of the present invention then provides a simple and reliable failure indication of insufficient air flow in a system incorporating blower or fan assemblies with a minimum obstruction to the air flow. A thin flat plate placed at a small angle such as 8° to 10° to the direction of the air flow produces a lift force overcoming a spring force to deactuate an alarm switch when sufficient air flow is present.

Whereas the preferred form of the invention has been shown and described herein it should be realized that there may be many modifications, substitutions and alterations thereto without departing from the teachings of this invention.

Having described what is new and novel and desired to secure by letters patent, what is claimed is:

1. A fan failure detector apparatus associated with a system having a fluid flow producing assembly that provides circulation, said fan failure detector apparatus comprising:

central thin plate element rotatably mounted at one end and disposed above the flow output of the fluid flow producing assembly, said plate element including a cenrtral flow portion oriented at a small angle relative to the fluid flow direction so as to produce a lift force substantially perpendicular to the fluid flow on said flat plate, said plate element further including switch engaging means carried at the end opposite said rotatably mounted end; 39 switch means including actuating means carried by said system and located adjacent the switch engaging means of said plate element, said switch means further including a set of contacts which are controlled by said actuating means; and means for urging said flat plate element and said switch engaging means toward said switch means so as to actuate said switch means when insufficient fluid flow is present from said fluid flow producing assembly, sufficient fluid flow producing a lift force on said plate element overcoming said urging means and deactuating said switch means, said urging means being mounted between said system and said flat plate element.

2. Apparatus as recited in claim 1 wherin the angle of said central portion relative to said fluid flow direction is approximately 8° to 10°.

3. Apparatus as recited in claim 1 wherein said urging means is a coil spring mounted between said system and said plate element.

4. Apparatus as recited in claim 1 wherein said actuating means is an actuator button and said switch engaging means includes a right angle tab portion extending from said plate element.

5. Apparatus as recited in claim 1 wherein said rotatable mounting of said plate element is accomplished by a hinge.

* * * * *

UNITED STATES PATENT OFFICE
CERTIFICATE OF CORRECTION

PATENT NO. : 3,851,128
DATED : November 26, 1974
INVENTOR(S) : IBRAHIM Y. ELGINDY It is certified that error appears in the above-identified patent and that said Letters Patent are hereby corrected as shown below:

Standard Inventor's heading [75] omitted --

IBRAHIM Y. ELGINDY,
       CHICAGO, ILLINOIS --

Column 4, line 6, "central" should be omitted and insert -- a -- line 9, change "cenrtral" to -- central -- line 14, "39" should be omitted.

Signed and sealed this 22nd day of April 1975.

(SEAL)
Attest:

RUTH C. MASON
Attesting Officer

C. MARSHALL DANN
Commissioner of Patents
and Trademarks